United States Patent [19]

Nambu et al.

[11] Patent Number: 5,281,636
[45] Date of Patent: Jan. 25, 1994

[54] THERMOSETTING COMPOSITION

[75] Inventors: Toshiro Nambu; Hirotoshi Kawaguchi, both of Kobe; Masanori Kai, Takasago; Hisao Furukawa, Kobe, all of Japan

[73] Assignee: Kanegafuchi Kagaku Kogyo Kabushiki Kaisha, Osaka, Japan

[21] Appl. No.: 751,038

[22] Filed: Aug. 28, 1991

[30] Foreign Application Priority Data

Aug. 30, 1990 [JP] Japan .................. 2-230427

[51] Int. Cl.$^5$ .................. C08K 5/06; C08L 43/04
[52] U.S. Cl. .................. 524/378; 524/379; 524/521; 525/100; 525/209
[58] Field of Search ........... 525/100, 209; 524/521, 524/379, 378

[56] References Cited

U.S. PATENT DOCUMENTS

| | | | |
|---|---|---|---|
| 4,191,713 | 3/1980 | Yonezawa et al. | 525/102 |
| 4,334,036 | 6/1982 | Yonezawa et al. | 525/102 |
| 4,578,417 | 3/1986 | Furukawa et al. | 524/378 |

FOREIGN PATENT DOCUMENTS

| | | |
|---|---|---|
| 318880 | 6/1989 | European Pat. Off. . |
| 0396914 | 11/1990 | European Pat. Off. . |
| 57-36109 | 2/1982 | Japan . |
| 58-157810 | 9/1983 | Japan . |
| 63-33512 | 7/1988 | Japan . |
| 3-095249 | 4/1991 | Japan . |

*Primary Examiner*—Ralph H. Dean
*Attorney, Agent, or Firm*—Varndell Legal Group

[57] ABSTRACT

A thermosetting composition comprising (A) a carboxyl group-containing polyol resin, (B) a hydrolyzable silyl group-containing polymer, and at least one member selected from the group consisting of (C) a dehydrating agent and (D) an alcohol. The composition of the present invention is excellent in the physical properties of the film as well as the storage stability of the coating composition compared to the known compositions containing the curing catalyst.

8 Claims, No Drawings

THERMOSETTING COMPOSITION

BACKGROUND OF THE INVENTION

The present invention relates to a thermosetting composition, and more particularly to a thermosetting composition suitable for use of top coatings for automobiles, outer walls of buildings, industrial equipments, steel furnitures, household electric appliances, plastics, and the like, especially clear coatings required to have excellent durability and appearance.

Thermosetting coatings which have hitherto been used contain a melamine resin such as an alkyd melamine resin, an acrylic melamine resin or an epoxy melamine resin as a crosslinking agent. Accordingly, there cannot be solved a problem that a bad-smelling caused from the melamine resin remains.

Japanese Unexamined Patent Publication No. 141952/1989 discloses a crosslinking mechanism of a polyol resin and a hydrolyzable silyl group-containing resin, which is quite different from conventional crosslinking mechanism of the polyol resin and the melamine resin.

However, when the mixture of the polyol resin and the hydrolyzable silyl group-containing polymer is used as the coating composition which is required to rapidly cure the coating film without using a catalyst, it is required to heat the film to a high temperature, in other words, a large amount of energy is consumed, because a curing speed of the film of the mixture containing no curing catalyst is slow at room temperature or even if heating it to a relatively low temperature.

Although the above-mentioned defect can be solved by using the curing catalyst together with the mixture of the polyol resin and the hydrolyzable silyl group-containing polymer, such a composition is used as a two-component composition, that is, the curing catalyst is admixed with the mixture just before the use of the composition. Also, Japanese Patent Application No. 70926/1989 discloses that the mixture of the polyol resin and the hydrolyzable silyl group-containing polymer containing the curing catalyst is admixed with a dehydrating agent or an alkyl alcohol, whereby the obtained composition can be used as a one-component composition.

In any case, the above-mentioned compositions are unsatisfactory in storage stability under semi-open conditions.

An object of the present invention is to provide a thermosetting composition which excellent in reactivity as well as stability and appearance.

This and the other objects of the present invention will become apparent from the following description hereinafter.

SUMMARY OF THE INVENTION

It has now been found that when a carboxyl group-containing polyol resin is combined with a hydrolyzable silyl group-containing polymer, the obtained mixture is excellent in reactivity even if the curing catalyst is not added to the mixture, because the carboxyl group acts as an internal catalyst.

In accordance with the present invention, there is provided a thermosetting composition which comprises (A) a carboxyl group-containing polyol resin, (B) a hydrolyzable silyl group-containing polymer, and at least one member selected from the group consisting of (C) a dehydrating agent and (D) an alcohol.

DETAILED DESCRIPTION

The carboxyl group-containing polyol resin used in the present invention as the component (A) is a component used for exhibiting the film properties such as the hardness just after baking and the solvent resistance.

The molecular weight and the hydroxyl value of the carboxyl group-containing polyol resin (A) are not particularly limited. It is preferable that the number average molecular weight of the polyol resin (A) is from 500 to 40,000, more preferably from 1,500 to 40,000, especially from 2,000 to 25,000, from the view point of the viscosity of the coating composition and the physical properties of a film (a coating film prepared from the composition of the present invention) such as durability. Also, it is preferable that the hydroxyl value of the polyol resin (A) is from 10 to 300 mgKOH/g, more preferably from 20 to 250 mgKOH/g, from the view point of the film properties such as strength and durability.

Further, it is preferable that the acid value of the polyol resin (A) is from 3 to 150 mgKOH/g, more preferably from 10 to 100 mgKOH/g, especially from 20 to 80 mgKOH/g, more especially from 25 to 80 mgKOH/g. When the acid value is less than 3 mgKOH/g, the curing tends to become unsatisfactory, thus resulting in the unsatisfactory exhibition of the film properties such as the solvent resistance and hardness. The carboxyl group- 0 containing polyol resin (A) may be used alone or as an admixture thereof.

The carboxyl group-containing polyol resin (A) can be prepared, for instance, by polymerizing a carboxyl group-containing monomer (A-1) such as acrylic acid, methacrylic acid, or a polycarboxylic acid or its derivative, a hydroxyl group-containing monomer (A-2) and a vinyl monomer polymerizable therewith (A-3).

The carboxyl group-containing monomer (A-1) is not particularly limited. Examples of the monomers (A-1) are, for instance, acrylic acid, methacrylic acid, polycarboxylic acids, derivatives of polycarboxylic acid, and the like. The polycarboxylic acids include saturated polycarboxylic acids and unsaturated polycarboxylic acids such as maleic acid, fumaric acid and itaconic acid. Examples of the derivatives of polycarboxylic acid are, for instance, esters, e.g., a diester or half ester of the polycarboxylic acid with an alcohol having 1 to 20 carbon atoms having a linear or branched chain, salts (alkali metal salt, ammonium salt, amine salt, and the like), anhydrides (e. g., maleic acid anhydride and itaconic acid anhydride), and the like.

The carboxyl group-containing monomer (A-1) may be used alone or as an admixture thereof.

The hydroxyl group-containing monomer (A-2) used in the present invention is not particularly limited. Typical examples of the hydroxyl group-containing monomers (A-2) are, for instance, an acrylic or methacrylic monomer containing hydroxyl group, e.g., 2-/hydroxyethyl acrylate or methacrylate, 2-hydroxypropyl acrylate or methacrylate, "Placcel FA-1" [polycaprolactone containing acryloyl group at the side end and which has a number average molecular weight (hereinafter referred to as "Mn") of 230] (commercially available from Daicel Chemical Industries, Ltd.), "Placcel FA-4"

(polycaprolactone containing acryloyl group at the side end and which has an $\overline{M}n$ of 572), "Placcel FM-1" (polycaprolactone containing methacryloyl group at the side end and which has an $\overline{M}n$ of 244), "Placcel FM-4" (polycaprolactone containing methacryloyl group at the side end and which has an $\overline{M}n$ of 600), 2-hydroxyethyl vinyl ether, and the like. The hydroxyl group-containing monomer (A-2) may be used alone or as an admixture thereof.

The monomers (A-3) other than and copolymerizable with the carboxyl group-containing monomer (A-1) and the hydroxyl group-containing monomer (A-2) are not particularly limited. Typical examples of the monomers are, for instance, derivatives of acrylic acid or methacrylic acid such as, methyl acrylate or methacrylate, ethyl acrylate or methacrylate, butyl acrylate or methacrylate, 2-ethylhexyl acrylate or methacrylate, stearyl acrylate or methacrylate, benzyl acrylate or methacrylate, cyclohexyl acrylate or methacrylate, trifluoroethyl acrylate or methacrylate, pentafluoropropyl acrylate or methacrylate, perfluorocyclohexyl acrylate or methacrylate, acrylonitrile, methacrylonitrule, glycidyl acrylate or methacrylate, dimethylaminoethyl acrylate or methacrylate, diethylaminoethyl acrylate or methacrylate, acrylamide, methacrylamide, α-ethyl acrylamide or methacrylamide, N-butoxymethyl acrylamide or methacrylamide, N,N-dimethyl acrylamide, N-methyl acrylamide, acryloyl morpholine, N-methylol acrylamide or methacrylamide, "Aronix M-5700" (commercially available from Toagosei Chemical Industry Co., Ltd.), "AS-6", "AN-6", "AA-6", "AB-6", "AK-5", (which are macromers commercially available from Toagosei Chemical Industry Co., Ltd,), a phosphate group-containing vinyl compound which is prepared by the condensation of a hydroxyalkyl ester of acrylic or methacrylic acid with phosphoric acid or phosphoric esters, an acrylate or methacrylate containing an urethane bond or siloxane bond such as

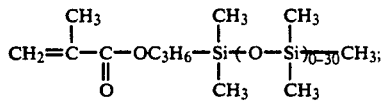

an aromatic hydrocarbon vinyl compound such as styrene, o-methylstyrene, chlorostyrene, styrenesulfonic acid or vinyl toluene; a vinyl ester such as vinyl acetate or vinyl propionate; an allyl compound such as diallyl phthalate; an amino group-containing vinyl compound such as vinylpyridine, aminoethyl vinyl ether; an amide group-containing vinyl compound such as itaconic acid diamide, crotonamide, maleic acid diamide, fumaric acid diamide, N-vinylpyrrolidone; an other vinyl compound such as methyl vinyl ether, cyclohexyl vinyl ether, vinyl chloride, vinylidene chloride, chloroprene, propylene, butadiene, isoprene, fluoroolefin, maleimide, N-vinylimidazole or vinylsulfonic acid; and the like. The carboxyl group-containing polyol resin (A) may contain an urethane bond or siloxane bond in its chain so long as the amount of the urethane or siloxane bond in the resin (A) is less than 50 % of the resin (A).

It is preferable that the carboxyl group-containing polyol resin (A) is prepared by solution polymerization using an azo radical polymerization initiator such as azobisisobutyronitrile since the resin (A) can be easily obtained according to the above-mentioned method. In such a solution polymerization, if necessary, a chain transfer agent such as n-dodecyl mercaptane, t-dodecyl mercaptane or n-butyl mercaptane is used thereby controlling the molecular weight of the resin (A). Non-reactive solvents are used without particular limitations in the polymerization.

In the invention, the carboxyl group-containing polyol resin (A) can be used in the state of a solution and in the state of a nonaqueous dispersion wherein the particles of the polyol resin (A) are dispersed in the organic solvent incapable of solving the resin (A) particles, such as pentane, hexane or heptane.

Also, as the carboxyl group-containing polyol resin (A), polyester-polyol resins can be used. The polyester-polyol resins are effective in case of obtaining a high solid composition, since when using the resins, the obtained composition has a low viscosity. The polyester-polyol resins include polyesters prepared, for instance, by subjecting to dehydration-condensation of a polycarboxylic acid such as phthalic acid, hexahydrophthalic acid, methylhexahydrophthalic acid, adipic acid, trimellitic acid or pyromellitic acid and a polyol such as ethylene glycol, propylene glycol, glycerol, trimethylolpropane or pentaerythritol at 200° to 250° C., and having a number average molecular weight of 500 to 2000, a polycaprolactone-polyol having carboxyl group in its side chain and having a number average molecular weight of 500 to 2000, and the like.

The carboxyl group-containing polyol resin (A) may be used alone or as an admixture thereof.

The hydrolyzable silyl group-containing polymer used in the present invention as the component (B) is a polymer having at the molecular ends or side chains in the molecule at least one, preferably from 2 to 100, alkoxysilyl group having the formula (I):

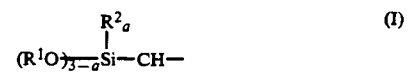

wherein $R^1$ is an alkyl group, $R^2$ is a hydrogen atom or a monovalent hydrocarbon group, $a$ is 0, 1 or 2.

In the formula (I), it is preferable that the alkyl group $R^1$ has 1 to 10 carbon atoms, more preferably to 4 carbon atoms. When the group $R^1$ is an alkyl group having more than 10 carbon atoms or it is a group other than the alkyl group such as phenyl group or benzyl group, the reactivity of the alkoxysilyl group becomes poor. Example of the group $R^1$ are, for instance, methyl group, ethyl group, n-propyl group, isopropyl group, n-butyl group, isobutyl group, and the like. As the group $R^2$, there are cited an alkyl group, an aryl group and an aralkyl group. It is preferable that the group $R^2$ is the alkyl, aryl or aralkyl group having 1 to 10 carbon atoms. Examples of the alkyl groups having 1 to 10 carbon atoms as the group $R^2$ are, for instance methyl group, ethyl group, n-propyl group, isopropyl group, n-butyl group, isobutyl group, and the like. Examples of the aryl groups are, for instance, phenyl group, tolyl group, xylyl group, and the like. Examples of the aralkyl groups are, for instance, benzyl group, and the like. Examples of the alkoxysilyl group (I) are, for instance, a group having the formula (II):

wherein R³ is hydrogen atom or a monovalent hydrocarbon group, and R¹, R² and a are as defined above, and the like. As the monovalent hydrocarbon group as the group R³, there are cited and alkyl group, an aryl group and an aralkyl group. An alkyl, aryl or aralkyl group having, 1 to 10 carbon atoms is preferable. As the typical 5 examples of the group R3, the same groups as cited as the group R2 are cited.

Examples of the alkoxysilyl groups (I) are, for instance, groups included in alkoxysilyl group-containing monomers as mentioned below. Since the main chain of the hydrolyzable silyl group-containing polymer (B) substantially consists of an acrylic copolymer chain, the cured product is excellent in weatherability, chemical resistance, water resistance, and the like. Further, since the alkoxysilyl group shown in the formula (I) is attached to the carbon atom, the cured product is more excellent in water resistance, alkali resistance, acid resistance, and the like. The alkoxysilyl group reacts with the hydroxyl group in the carboxyl group-containing polyol resin (A) to form a siloxyl linkage

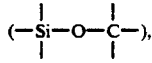

as well as the alkoxysilyl groups react with each other to form a siloxane linkage

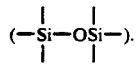

When the number of the alxoxysilyl groups in the component (B) is less than one in one molecule, the solvent resistance of the coating film becomes poor. It is preferable that the number average molecular weight of the component (B) is from 1,000 to 30,000, more preferably from 3,000 to 25,000, from the view point of the film properties such as strength and durability.

The hydrolyzable silyl group-containing polymer (B) can be prepared, for instance, by copolymerizing acrylic or methacrylic acid, or a derivative thereof (B-with an alkoxysilyl group-containing monomer (B-2).

The monomers (B-1) are not particularly limited. Typical examples of the monomers (B-1) are, for instance, an acrylic or methacrylic ester monomer, i.e., methyl acrylate or methacrylate, ethyl acrylate or methacrylate, butyl acrylate or methacrylate, 2-ethylhexyl acrylate or methacrylate, stearyl acrylate or methacrylate, benzyl acrylate or methacrylate, cyclohexyl acrylate or methacrylate, trifluoroethyl acrylate or methacrylate, pentafluoropropyl acrylate or methacrylate, perfluorocyclohexyl acrylate or methacrylate, acrylonitrile, methacrylonitrule, glycidyl acrylte or methacrylate, dimethylaminoethyl acrylate or methacrylate, diethylaminoethyl acrylate or methacrylate, acrylamide, methacrylamide, α-ethyl acrylamide or methacrylamide, N-butoxymethyl acrylamide or methacrylamide, N,N-dimethyl acrylamide, N-methyl acrylamide, acryloyl morpholine, 2-hydroxyethyl acrylate or methacrylate, 2-hydroxypropyl acrylate or methacrylate, N-methylol acrylamide or methacrylamide, glycidyl acrylate or methacrylate, "Aronix M-5700", "AS-6", "AN-6", "AA-6", "AB-6", "AK-5", "Placcel FA-1", "Placcel FA-4", "Placcel FM-1", "Placcel FM-4", a phosphate group-containing vinyl compound which is prepared by the condensation of acrylic or methacrylic acid with phosphoric acid or phosphoric esters, an acrylate or methacrylate containing an urethane bond or siloxane bond such as

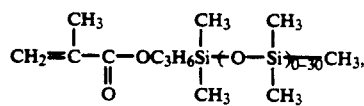

and the like.

The monomer (B-1) may be used alone or as an admixture thereof.

The alkoxysilyl group-containing monomers (B-2) are not particularly limited so long as the monomer has a polymerizable unsaturated double bond and the alkoxysilyl group as shown in the formula (I). Typical examples of the alkoxysilyl group-containing mononers (B-1) are, for instance, alkoxysilyl group-containing vinyl monomers such as

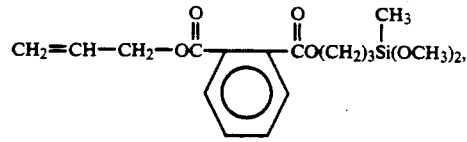

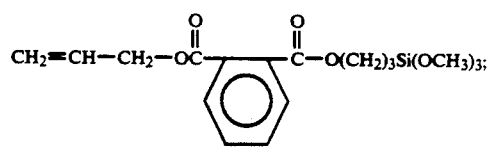

an acrylate or methacrylate having the alkoxysilyl group through an urethane bond or a siloxane bond at the molecular ends such as

and the like. The monomer (B-2) may be used alone or as an admixture thereof.

It is preferable that the hydrolyzable silyl group-containing polymer (B) has 5 to 90 % by weight, more preferably from 11 to 77 % by weight, of the units derived from the alkoxysilyl group-containing monomer (B-2), from the viewpoints of the curability of the composition and the durability of the coating film.

The hydrolyzable silyl group-containing polymer (B) may contain an urethane bond or siloxane bond, or monomers other than the acrylic or methacrylic acid and its derivative (B-1) in its main chain so long as the amount of the urethane or siloxane bond, or the other monomers (B-3) in the polymer (B) is less than 50 % by weight of the polymer (B). The monomers other than acrylic or methacrylic monomers (B-3) are not particularly limited. Typical examples of the other monomers are, for instance, an aromatic hydrocarbon vinyl compound such as styrene, α-methylstyrene, chlorostyrene, 4-hydroxystyrene or vinyl toluene; an unsaturated carboxylic acid, an anhydride (maleic anhydride), a vinyl ester such as vinyl acetate or vinyl propionate; an allyl compound such as diallyl phthalate; an amino group-containing vinyl compound such as vinylpyridine, aminoethyl vinyl ether; an amide group-containing vinyl compound such as itaconic acid diamide, crotonamide, maleic acid diamide, fumaric acid diamide, N-vinylpyrrolidone; an other vinyl compound such as methyl vinyl ether, 2-hydroxyethyl vinyl ether, cyclohexyl vinyl ether, vinyl chloride, vinylidene chloride, chloroprene, propylene, butadiene, isoprene, fluoroolefin, maleimide, or N-vinylimidazole; and the like.

The hydrolyzable silyl group-containing polymer (B) can be prepared, for instance, in a manner as described in USP 4,334,036, USP 4,810,767, Japanese Unexamined Patent Publications No. 36109/1982 and No. 157810/1983, and the like. Especially, solution polymerizations using an azo radical polymerization initiator such as azobisisobutyronitrile are most preferable.

If necessary, in the above solution polymerization, there may be used a chain transfer agent for controlling the molecular weight of the hydrolyzable silyl group-containing polymer (B). Examples of the chain transfer agents are, for instance, n-dodecyl mercaptan, t-dodecyl mercaptan, n-butyl mercaptan, γ-mercaptopropyltrimethoxysilane, γ-mercaptopropyl-triethoxysilane, γ-mercaptopropylmethyldimethoxysilane, γ-mercaptopropylmethyldiethoxysilane, $(CH_3O)_3Si-S-S-Si(OCH_3)_3$, $(CH_3O)_3Si-S_8-Si(OCH_3)_3$, and the like. Particularly, when using the chain transfer agent having the alkoxysilyl group in its molecule, such as γ-mercaptopropyltrimethoxysilane, it is possible to introduce the alkoxysilyl group into the polymer (B) at the polymer ends.

Non-reactive solvents are used in the above-mentioned solution polymerization without particular limitations. Examples of the non-reactive solvents are, for instance, hydrocarbons such as toluene, xylene, Solvesso #100 (product of EXXON), n-hexane and cyclohexane, acetic esters such as ethyl acetate and butyl acetate, alcohols such as methanol, ethanol, isopropanol and n-butanol, ethers such as ethyl cellosolve, butyl cellosolve and cellosolve acetate, ketones such as methyl ethyl ketone, ethyl acetoacetate, acetylacetone, diacetone alcohol, methyl isobutyl ketone and acetone, and the like.

The hydrolyzable silyl group-containing polymer (B) may be used alone or as an admixture thereof.

The amount of the hydrolyzable silyl group-containing polymer (B) is not particularly limited. It is preferable that the weight ratio of the component (A) to the compound (B) is from 9/1 to 1/9, more preferably from 8/2 to 2/8. When the weight ratio of (A)/(B) is more than 9/1, the water resistance of the obtained film is lowered. On the other hand, when the weight ratio of (A)/(B) is less than 1/9, the effects for improving the film properties such as appearance and hardness, obtained from the use of the component (A) are unsatisfactorily exhibited.

A component capable of accelerating the curing (accelerator) may be added to the composition of the present invention within a range such that the appearance and the storage stability of the obtained composition are not impaired. Examples of the most effective accelerators are, for instance, a primary amine such as ethylamine, butylamine, monoethanolamine or 2-amino-2-methyl-1-propanol; a secondary amine such as diethylamine, dibutylamine, piperidine or diethanolamine; a tertiary amine such as triethylamine, tributylamine, N,N-dimethylbenzylamine, N,N-dimetylcyclohexylamine, N,N-dimethyldodecylamine or triethylenediamine. The amount of the amine as mentioned above is 1.1 moles or less per mole of carboxyl group in the component (A), preferably from 0.2 to 0.9 mole per mole of carboxyl group in the component (A). As a method for adding the accelerator to the composition of the present invention, the accelerator can be previously added to the component (A) as well as it can be added to the obtained composition. It can be considered that the amine compound is reacted with the carboxyl group in the component (A) to form a salt, and the salt accelerates the curing of the composition.

In the present invention, a dehydrating agent is used as the component (C). Examples of the dehydrating agents (C) are, for instance, alkoxy ester compounds such as methyl orthoformate, ethyl orthoformate, methyl orthoacetate, ethyl orthoacetate, methyltrimethoxysilane, γ-methacryloyloxypropyltrimethoxysilane, vinyltrimethoxysilane, methyl silicate and ethyl silicate, and the like. Preferably, there are used methyl orthoformate and methyl orthoacetate. The dehydrating agents can be added before, after or during the polymerization of the hydrolyzable silyl group-containing polymer (B).

The amount of the dehydrating agent (C) is not particularly limited. The amount is usually not more than 100 parts by weight, preferably not more than 50 parts by weight, based on 100 parts by weight of the components (A) and (B) (solid matter). When the composition of the present invention contains no alcohol (D), the amount of the dehydrating agent (C) is from 0.5 to 100 parts by weight, more preferably from 2 to 50 parts by weight, based on 100 parts by weight of the components (A) and (B) (solid matter).

In the present invention, an alcohol is used as the component (D). Examples of the alcohols (D) are, for instance, alkyl alcohols having an alkyl group with 1 to 10 carbon atoms are preferable. Examples of the preferable alcohols are, for instance, methyl alcohol, ethyl alcohol, n-propyl alcohol, isopropyl alcohol, n-butyl alcohol, isobutyl alcohol, sec-butyl alcohol, tert-butyl alcohol, n-amyl alcohol, isoamyl alcohol, hexyl alcohol, octyl alcohol, cellosolve, and the like. The amount of the alcohol is not particularly limited. Usually, the amount of the alcohol is not more than 100 parts by weight, preferably not more than 50 parts by weight, based on 100 parts by weight of the components (A) and (B) (solid matter). When the composition of the present invention contains no dehydrating agent, the amount of the alcohol is from 0.5 to 100 parts by weight, preferably form 2 to 50 parts by weight, based on the components (A) and (B) (solid matter). When the composition of the present invention contains both the alcohol and the dehydrating agent (C) in addition to the components (A) and (B), the storage stability of the composition can remarkably improved, compared to the composition comprising the components (A), (B) and (C).

The total amount of the all solvents varies depending on the molecular weights of the components (A) and (B) or the composition of (A) and (B), and it is adjusted to the solid content or viscosity of the coating composition so as to be practically used. Generally, the amount is from 20 to 200 parts by weight based on 100 parts by weight of the components (A) and (B) (solid matter).

In order to improve the film properties such as adhesion, hardness and solvent resistance, hydrolyzable silicon compounds may be added to the composition of the present invention. The hydrolyzable silicon compound is a compound having a hydrolyzable silyl group-containing compound at the molecular ends or the side chains. Preferable examples of the hydrolyzable silicon compounds are, for instance, hydrolyzable silance compounds, their condensation products, their reaction products or mixtures thereof.

Examples of the hydrolyzable silane compounds are, for instance, methyl silicate, methyltrimethoxysilane, ethyltrimethoxysilane, butyltrimethoxysilane, octyltrimethoxysilane, dodecyltrimethoxysilane, phenyltrimethoxysilane, vinyltrimethoxysilane, γ-methacryloyloxypropyltrimethyoxysilane, γ-acryloyloxypropyltrimethoxysilane, γ-glycidoxypropyltrimethoxysilane, γ-mercaptopropyltrimethoxysilane, γ-aminopropyltrimethoxysilane, N-β-aminoethyl-γ-aminopropyltrimethoxysilane, dimethyldimethoxysilane, diethyldimethoxysilane, dibutyldimethoxysilane, diphenyldimethoxysilane, vinylmethyldimethoxysilane, γ-methacryloyloxypropylmethyldimethoxysilane, trimethylmethoxysilane, triethylmethoxysilane, triphenylmethoxysilane, ethyl silicate, methyltriethoxysilane, ethyltriethoxysilane, butyltriethoxysilane, octyltriethoxysilane, dodecyltriethoxysilane, phenyltriethoxysilane, vinyltriethoxysilane, γ-methacryloyloxypropyltriethoxysilane, γ-acryloyloxypropyltriethoxysilane, γ-glycidoxypropyltriethoxysilane, γ-mercaptopropyltriethoxysilane, γ-aminopropyltriethoxysilane, N-β-aminoethyl-γ-aminopropyltriethoxysilane, dimethyldiethoxysilane, diethyldiethoxysilane, dibutyldiethoxysilane, diphenyldiethoxysilane, vinylmethyldiethoxysilane, γ-methacryloyloxypropylmethyldiethoxysilane, trimethylethoxysilane, triethylethoxysilane, triphenylmethoxysilane, and the like.

The condensation product of the silane compound prepared by partially hydrolyzing the silane compound then condensing it can be easily produced by mixing one or more kinds of the silane compounds as mentioned above with a necessary amount of water, and, if necessary, a small amount of a condensation catalyst such as hydrochloric acid or sulfuric acid, and partially hydrolyzing and condensing the silane compounds at room temperature to 100 ° C while removing the produced alcohol from the reaction mixture. Examples of a silane compound having methoxysilyl group, prepared by partially hydrolyzing methyl silicate then condensing it are, for instance, "Methyl Silicate 47" commercially available from NIPPON COLCOAT Kagaku Kabushiki Kaisha, "Methyl Silicate 51", "Methyl Silicate 55", "Methyl Silicate 58", "Methyl Silicate 60", and the like. Examples of a silane compound having methoxysilyl group, prepared by partially hydrolyzing methyltrimethoxysilane or dimethyldimethoxysilane then condensing it are, for instance, "AFP-1" (commercially available from Shin-Etsu Chemical Co., Ltd.), "AFP-2", "AFP-6", "KR213" (commercially available from Shin-Etsu Chemical Co., Ltd.), "KR217", "KR9218", "TSR165" (commercially available from Toshiba Silicone Co., Ltd.), "TR3357", "γ-1587"(commercially available from Nippon Unicar Kabushiki Kaisha), "FZ-3701", "FZ-3704", and the like. Examples of a silane compound having ethoxysilyl group, prepared by partially hydrolyzing ethyl silicate then condensing it are, for instance, "Ethyl Silicate 40" "HAS-1" (commercially available from NIPPON COLCOAT Kagaku Kabushiki Kaisha) "HAS-6", "HAS-10", and the like.

Examples of the reaction product of the above-mentioned hydrolyzable silane compounds are, for instance, a reaction product of a silane coupling agent containing amino group with a silane coupling agent containing epoxy group; a reaction product of a silane coupling agent containing amino group with a compound containing epoxy group such as ethylene oxide, butylene oxide, epichlorohydrine, epoxidated soybean oil, "Epicoat 828" (commercially available from γuka Shell Epoxy Kabushiki Kaisha) or "Epicoat 1001"; a reaction product of a silane coupling agent containing epoxy group with an amine, for instance, an aliphatic amine such as ethyl amine, diethyl amine, ethylene diamine, hexane diamine, diethylene triamine, triethylene tetramine or tetraethylene pentamine, an aromatic amine such as aniline or diphenyl amine, an alicyclic amine such as cyclopentyl amine or cyclohexyl amine; and the like.

The hydrolyzable silicon compound may be used alone or as an admixture thereof.

The amount of the hydrolyzable silicon compound is not particularly limited. Generally, the amount is from 0.01 to 100 parts by weight, preferably from 0.1 to 30 parts by weight, based on 100 parts by weight of the components (A) and (B) (solid matter). When the amount of the hydrolyzable silicon compound is less than 0.01 part by weight, the effects obtained by the addition of the silicon compound can be unsatisfactorily obtained. On the other hand, when the amount is more than 100 parts by weight, the appearance of the coating film becomes worse.

The composition of the present invention may contain, according to the uses thereof, various additives such as diluents, pigments including an extender pigment, ultraviolet absorbers, light stabilizers, agents for preventing precipitation and leveling agents; celluloses such as nitrocellulose and cellulose acetate butyrate, resins such as epoxy resins, melamine resins, vinyl chloride resins, chlorinated propylene resins, chlorinated rubbers and polyvinyl butyral, fillers, and the like.

The preparation method of the composition of the present invention is not particularly limited. For instance, the component (A) is merely blended, so-called cold-blended, with the component (B), or the component (A) and (B) are hot-blended, for instance, the components (A) and (B) are mixed and the mixture is heated to partially react, and the component (C) and/or the component (D) are added thereto.

The curing mechanism concerning the thus obtained composition of the present invention is that the hydroxyl group in the carboxyl group-containing polyol resin (A) reacts with the hydrolyzable silyl group in the hydrolyzable silyl group-containing polymer (B) to crosslink. Accordingly, the technique of the present invention is quite different from the known techniques using the melamine as the crosslinking agent.

In the present invention, the hydrolyzable silyl group-containing polymer (B) gives the excellent durability and chemical resistance (acid resistance and alkali resistance) to the obtained composition, and the carboxyl group-containing polyol resin (A) gives the excellent curability with heating in the presence of the resin (A) to the obtained composition.

The feature of the present invention is to provide the composition having the excellent storage stability, curability and appearance due to the presence of carboxyl groups in the component (A). It can be considered that owing to the effect resulting from the carboxyl group in the component (A) and the dehydrating agent (C) and the alcohol (D), the obtained composition can have the excellent storage stability. Also, it can be considered that since the carboxyl group in the component (A) can act so as to cure the film more uniformly when the composition is cured by heating to give the film, the composition of the present invention can have excellent curability and appearance.

The thermosetting composition of the present invention is suitable for use of various coatings applicable to various substrates such as automobiles, outer walls of buildings, industrial equipments, steel furnitures, household electric appliances and plastics, especially clear coating agents required to have excellent durability and appearance.

For instance, the composition of the present invention is applied to a substrate according to a usual manner such as dipping manner, spraying or brushing, and the coating film can be cured at a temperature of, usually not less than 30° C., preferably from 55° to 350° C. to give a coating film having excellent durability.

The present invention is more specifically described and explained by means of the following Examples in which all % and part are by weight unless otherwise noted. It is to be understood that the present invention is not limited to the Examples and various changes and modifications may be made in the present invention without departing from the spirit and scope thereof.

REFERENCE EXAMPLE 1

Preparation of a hydrolyzable silyl group-containing polymer (B)

A reactor equipped with a stirrer, a thermometer, a condenser, a nitrogen inlet tube and a dropping funnel was charged with 45.9 parts of xylene, and the reactor was heated to 110° C., while introducing nitrogen gas thereto. A monomer mixture (b) as shown below was added dropwise to the reactor at a uniform velocity through the dropping funnel over 5 hours.

| Mixture (b) | |
|---|---|
| Methyl methacrylate | 62.9 parts |
| Stearyl methacrylate | 6.9 parts |
| γ-Methacryloyloxypropyltrimethoxysilane | 30.2 parts |
| Xylene | 13.5 parts |
| 2,2'-Azobisisobutyronitrile | 4.5 parts |

After completing the addition of the mixture (b), 0.5 part of 2,2'-azobisisobutyronitrile and 5 parts of toluene were added dropwise to the reactor at a uniform velocity for 1 hour. After completing the addition, the resulting mixture was aged at 110° C. for 2 hours, then the mixture was cooled down and it was diluted with xylene to give a resin solution (b) having a solid concentration of 60 %. The properties of the resin are shown in Table 2.

REFERENCE EXAMPLES 2–8

Preparation of a carboxyl group-containing polyol resin (A)

The same reactor used as in Reference Example 1 was charged with 31.3 parts of butyl acetate and 9.5 parts of xylene instead of 45.9 parts of xylene, and the reactor was heated to 110° C, while introducing nitrogen gas thereto. Each monomer mixture (a-1) to (a-7) as shown in Table 1 was added to the reactor in the same manner as in Reference Example 1.

After completing the addition of the monomer mixture, 0.2 part of 2,2'-azobisisobutyronitrile and 3.8 parts of toluene were added dropwise to the reactor at a uniform velocity over 1 hour. After completing the addition, the resulting mixture was aged at 110° C. for 2 hours, then the mixture was cooled down, and it was diluted with xylene to give each resin solution (a-1) to (a-5) having a solid concentration of 60 %. The properties of the resin are shown in Table 2.

TABLE 1

| | Reference Example No. | | | | | | |
|---|---|---|---|---|---|---|---|
| | Ref. Ex. 2 | Ref. Ex. 3 | Ref. Ex. 4 | Ref. Ex. 5 | Ref. Ex. 6 | Ref. Ex. 7 | Ref. Ex. 8 |
| | Resin solution No. | | | | | | |
| | a-1 | a-2 | a-3 | a-4 | a-5 | a-6 | a-7 |
| Styrene | 10 | 10 | 28.3 | 28.3 | 28.3 | 10 | 15 |
| Methyl methacrylate | 13.3 | 15.3 | 4.4 | 7.1 | 7.4 | 13.3 | 7.2 |
| n-Butyl acrylate | 23.7 | 23.7 | 32.5 | 32.5 | 32.5 | 10.4 | 32.5 |
| Methacrylic acid | 0 | 0 | 3 | 0.3 | 0 | 0 | 0 |
| Acrylic acid | 5 | 3 | 0 | 0 | 0 | 1.3 | 13.5 |
| Praccel FM-1 | 48 | 48 | 31.8 | 31.8 | 31.8 | 65.0 | 31.8 |
| 2,2'-Azobisisobutyronitrile | 4.5 | 4.5 | 4.5 | 4.5 | 4.5 | 4.5 | 4.5 |

TABLE 2

| Resin solution | b | a-1 | a-2 | a-3 | a-4 | a-5 | a-6 | a-7 |
|---|---|---|---|---|---|---|---|---|
| Non-volatile matter | 60 | 60 | 60 | 60 | 60 | 60 | 60 | 60 |

TABLE 2-continued

| Resin solution | b | a-1 | a-2 | a-3 | a-4 | a-5 | a-6 | a-7 |
|---|---|---|---|---|---|---|---|---|
| (%) | | | | | | | | |
| Viscosity (28° C., cps) | 900 | 1,400 | 1,250 | 1,200 | 850 | 850 | 1300 | 1300 |
| Acid value (mgKOH/g solid) | 0 | 39 | 23 | 20 | 2 | 0 | 10 | 100 |
| Hydroxyl value (mgKOH/g solid) | 0 | 110 | 110 | 73 | 73 | 73 | 150 | 73 |
| Number average molecular weight | 6,000 | 6,000 | 6,000 | 6,000 | 6,000 | 6,000 | 6,000 | 6,000 |
| Color number (Gardner) | <1 | <1 | <1 | <1 | <1 | <1 | <1 | <1 |

EXAMPLES 1-5 AND COMPARATIVE EXAMPLES 1-3

A top coat clear coating was prepared by mixing components shown in Table 3.

A mild steal plate was degreased, then subjected to phosphatizing treatment, onto which an automobile epoxy amide cationic electroprimer was coated, then was coated with an intermediate surfacer to give a test piece. After coating the test piece with a commercially available acrylic melamine resin coating (silver metallic base), a coating composition containing the top coat clear coating as obtained above was coated on the silver metallic base by means of the wet on wet coating, and the coated plate was baked at 140° C. for 30 minutes. The above-mentioned coating composition was prepared by mixing 1 part, based on 100 parts of the resin solid matter, of "TINUVIN 900" (benzotriazol ultraviolet absorber commercially available from Ciba-Geigy AG. and 1 part, based on 100 parts of the resin solid matter, of "TINUVIN 114" (hindered amine light stabilizer), and diluting with xylene until a viscosity suitable for coating was obtained. The obtained film had the dried film thickness of the base coat of about 15 μm and the dried film thickness of the top coat clear coating of 30 μm.

As to the obtained film, the gel percentage, hardness, xylene rubbing, and boiling water test were measured or conducted, and as to the coating composition, the storage stability was measured as follows:

Gel percentage

The film is wrapped with a 200-mesh stainless wire net, and it is dipped in acetone for 24 hours. The percentage of the film which was not solved in acetone was calculate.

Hardness

The hardness is measured according to Japanese Industries Standards (JIS) K 5400.

Xylene rubbing

The baked film is rubbed back and forth ten times with an absorbent cotton impregnated with xylene and the surface of the film is observed with the naked eye.
O: No change
Δ: The film is etched, but retaining substantial gloss
X: Gloss of the film is lost

Boiling water test

The film is dipped in boiling water for 3 hours, the film appearance is observed with the naked eye.
O: No change
Δ: The film is etched, but retaining substantial gloss
X: Gloss of the film is lost

Storage stability

A 200 ml polyethylene cup is charged with 100 ml of the coating composition as obtained above, the cup is lightly covered with an aluminum foil, and it is allowed to stand at 30° to 35° C. The number of days until the composition is gelled is examined.

The results are shown in Table 3.

TABLE 3

| | Ex. 1 | Ex. 2 | Ex. 3 | Ex. 4 | Ex. 5 | Com. Ex. 1 | Com. Ex. 2 | Com. Ex. 3 |
|---|---|---|---|---|---|---|---|---|
| Top coat clear coating | | | | | | | | |
| Hydrolyzable silyl group-containing polymer (B) (part) | 60 | 60 | 60 | 60 | 70 | 60 | 60 | 60 |
| Carboxyl group-containing polyol resin (A) kind | (a-1) | (a-2) | (a-3) | (a-6) | (a-7) | (a-4) | (a-5) | (a-2) |
| Amount (part) | 40 | 40 | 40 | 40 | 30 | 40 | 40 | 40 |
| Dehydrating agent*1 | 3 | 3 | 3 | 3 | 6 | 3 | 3 | 3 |
| Methanol | 3 | 3 | 3 | 3 | 3 | 3 | 3 | 3 |
| Butanol | 6 | 6 | 6 | 6 | 6 | 6 | 6 | 6 |
| Xylene | 20 | 20 | 20 | 20 | 20 | 20 | 20 | 20 |
| DP-8*2 | 0 | 0 | 0 | 0 | 0 | 0 | 0 | 1.2 |
| Film properties | | | | | | | | |
| Gel percentage (%) | 96 | 94 | 94 | 80 | 97 | 32 | 0 | 94.5 |
| Pencil hardness | 2H | 2H | 2H | HB | 2H | B | 5B | 2H |
| Appearance (DOI) | 93 | 94 | 90 | 85 | 80 | 85 | 85 | 60 |
| Xylene rubbing | O | O | O | Δ | O | Δ | X | O |
| Boiling water test | O | O | O | Δ | O | Δ | X | O |
| Storage stability | more than 10 | more than 10 | more than 10 | more than 10 | 2-3 days | more than 10 | more than 10 | less than one |

TABLE 3-continued

|  | Ex. 1 | Ex. 2 | Ex. 3 | Ex. 4 | Ex. 5 | Com. Ex. 1 | Com. Ex. 2 | Com. Ex. 3 |
|---|---|---|---|---|---|---|---|---|
|  | days | days | days | days |  | days | days | day |

Notes:
*1: Methyl orthoacetate
*2: Di-2-ethylhexyl acid phosphate, commercially available from Daihachi Kagaku Kabushiki Kaisha As apparent from the results shown in Table 3, the thermosetting composition of the present invention is excellent in physical properties of the film and the storage stability of the coating composition compared to the known compositions containing the curing catalyst.

In addition to the ingredients used in the Examples, other ingredients can be used in the Examples as set forth in the specification to obtain substantially the same results.

What we claim is:

1. A thermosetting composition having increased stability and consisting essentially of
   a carboxyl group-containing polyol resin having an acid value of 3 to 150 mg KOH/g,
   a hydrolyzable silyl group-containing polymer, and at least one member selected from the group consisting of
   a non-alcohol dehydrating agent and
   an alcohol.

2. The composition of claim 1, wherein said resin (A) has a hydroxyl value of 10 to 300 mgKOH/g and a number average molecular weight of 500 to 40,000.

3. The composition of claim 1, wherein said polymer (B) is a polymer having 5 to 90 % by weight of units of a vinyl monomer having a polymerizable unsaturated double bond and an alkoxysilyl group.

4. The composition of claim 1, wherein said dehydrating agent (C) is a hydrolyzable ester compound.

5. The composition of claim 1, wherein said alcohol (D) is an alkyl alcohol.

6. The composition of claim 1, which comprises both a hydroxlyzable ester compound as said dehydrating agent (C) and an alkyl alcohol as said alcohol (D).

7. The composition of claim 1, wherein said dehydrating agent (C) is a member selected from a group consisting of an alkyl orthoformate and an alkyl orthoacetate.

8. The composition of claim 1, wherein said alcohol (D) is a $C_{1-10}$ alkyl alcohol.

* * * * *